United States Patent
Inoue et al.

(10) Patent No.: US 12,392,627 B2
(45) Date of Patent: Aug. 19, 2025

(54) INTUITIVE DISPLAY OF DRIVING ROUTE OF UNMANNED GROUND VEHICLES

(71) Applicant: Rakuten Mobile, Inc., Tokyo (JP)

(72) Inventors: Madoka Inoue, Tokyo (JP); Kensuke Koda, Tokyo (JP); Kelvin Ka Sin Cheng, Tokyo (JP); Soh Masuko, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/565,495

(22) PCT Filed: Dec. 28, 2022

(86) PCT No.: PCT/JP2022/048572
§ 371 (c)(1),
(2) Date: Nov. 29, 2023

(87) PCT Pub. No.: WO2024/142373
PCT Pub. Date: Jul. 4, 2024

(65) Prior Publication Data
US 2025/0093171 A1    Mar. 20, 2025

(51) Int. Cl.
*G01C 21/36* (2006.01)
*G06F 3/01* (2006.01)
(Continued)

(52) U.S. Cl.
CPC ........... *G01C 21/3632* (2013.01); *G06F 3/01* (2013.01); *G07C 5/008* (2013.01); *G08G 1/166* (2013.01)

(58) Field of Classification Search
CPC .... G01C 21/3632; G07C 5/008; G08G 1/166; G06F 3/01
See application file for complete search history.

(56) References Cited

U.S. PATENT DOCUMENTS 9,475,422 B2 * 10/2016 Hillis ................... B60Q 1/5037
9,884,585 B1 *  2/2018 Lubbers .............. B60W 30/095
(Continued)

FOREIGN PATENT DOCUMENTS

JP    2002169615 A      6/2002
JP    2015125464 A1 *   7/2015    ........... G06F 3/0346

OTHER PUBLICATIONS

"Looking to a Future of Coexistence with Robots! Verifying the safety of automated delivery robots by visualizing their travel paths using 5G x AR", [online] [Retrieved on Jul. 5, 2023] Retrieved from the Internet <URL : https://corp.mobile.rakuten.co.jp/blog/2022/0913_01/ >, 5pp.

*Primary Examiner* — John A Tweel, Jr.
(74) *Attorney, Agent, or Firm* — HAUPTMAN HAM, LLP

(57) ABSTRACT

An interference controller apparatus performs a process for acquiring a first position at which an unmanned ground vehicle is positioned and a second position at which a wearable device worn by a user is positioned, respectively; a process for acquiring route information indicating a route on which the unmanned ground vehicle is to travel; a process for acquiring a property related to a traveling of the unmanned ground vehicle; a process for generating a first signal for displaying a first image indicating a direction and a path that the unmanned ground vehicle is to travel based on the first position and the route information; a process for generating a second signal for displaying a second image indicating a zone where an entry of a user wearing the wearable device is to be restricted, based on the first position, the second position, and the route information; and a process for transmitting the first signal and the second signal to the wearable device. The first signal is generated such that the first image dynamically changes to be dis- (Continued)

played based on the property of the unmanned ground vehicle.

10 Claims, 8 Drawing Sheets

(51) Int. Cl.
*G07C 5/00* (2006.01)
*G08G 1/16* (2006.01)

(56) References Cited

U.S. PATENT DOCUMENTS

| | | | |
|---|---|---|---|
| 11,008,000 B2 * | 5/2021 | Chang | B60W 30/0953 |
| 11,971,720 B2 * | 4/2024 | Bröring | B60K 35/22 |
| 2017/0262715 A1 * | 9/2017 | Kozuka | G08G 1/005 |
| 2017/0345292 A1 * | 11/2017 | Haran | G08G 1/166 |

* cited by examiner

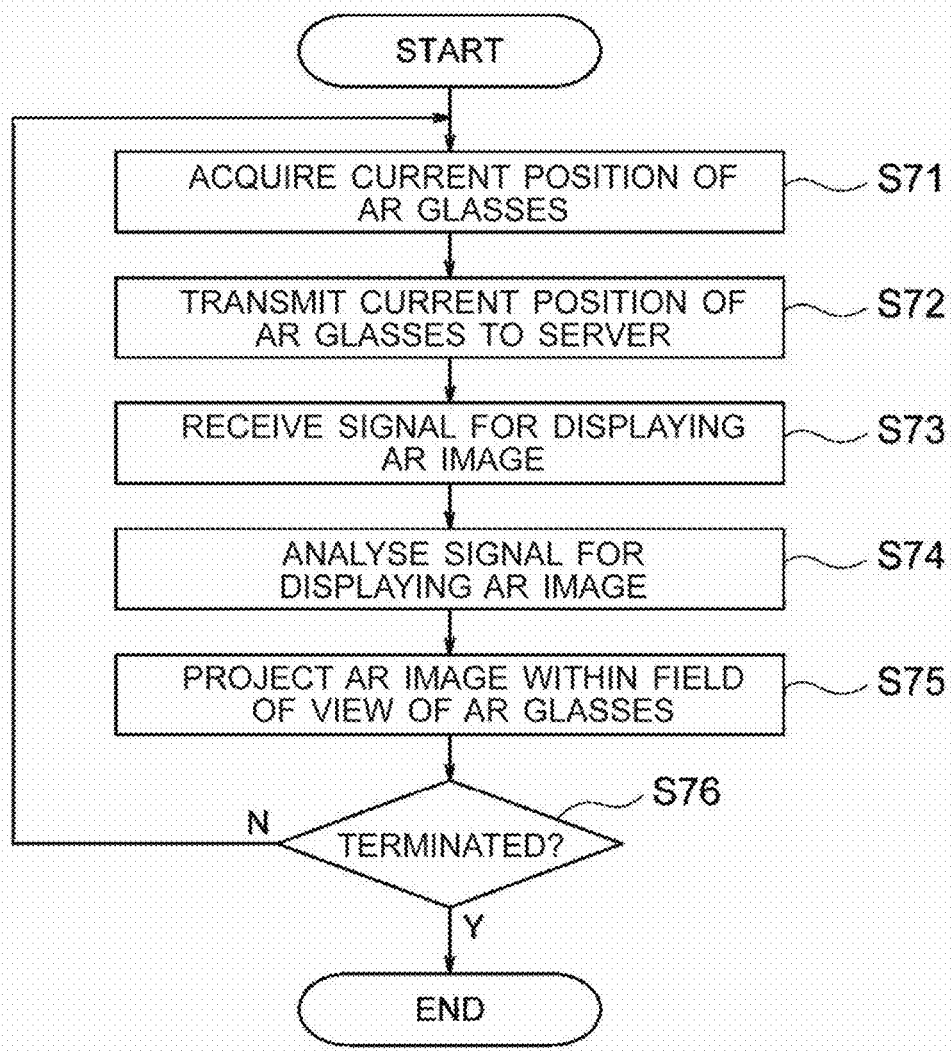

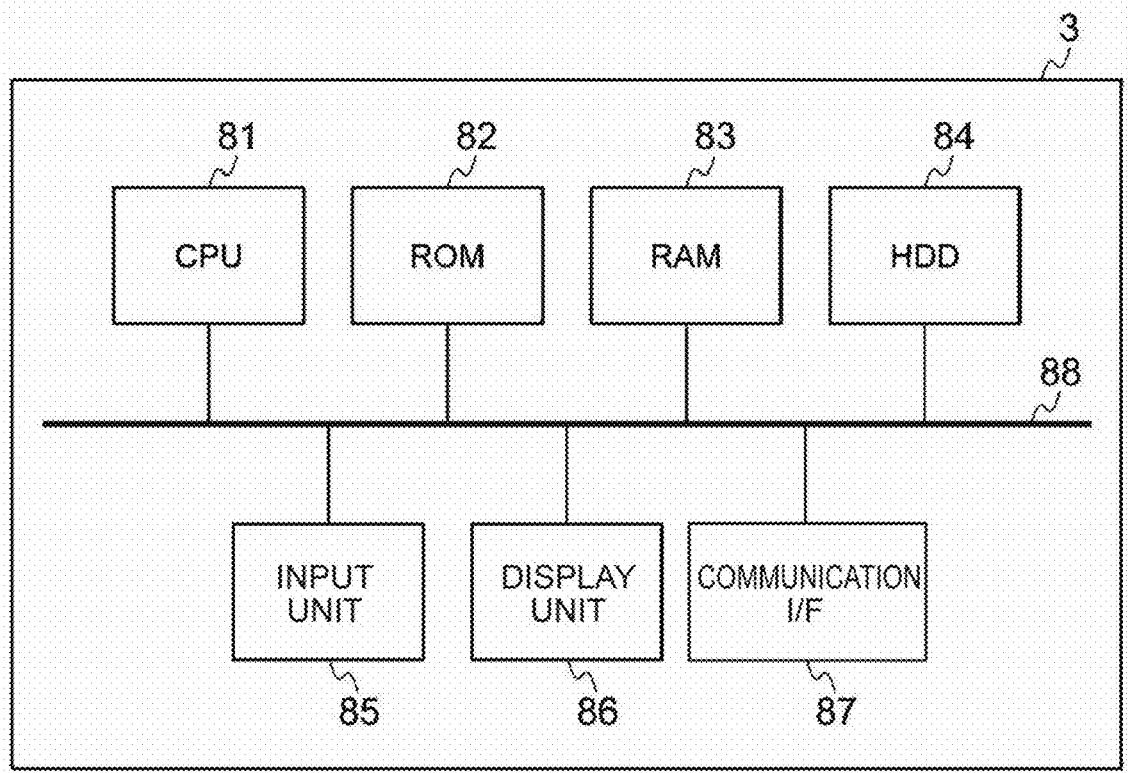

INTUITIVE DISPLAY OF DRIVING ROUTE OF UNMANNED GROUND VEHICLES

RELATED APPLICATIONS

The present application is a National Phase of International Application Number PCT/JP2022/048572, filed Dec. 28, 2022.

TECHNICAL FIELD

The present disclosure relates to technologies for avoiding collisions between unmanned ground vehicles and people.

BACKGROUND ART

Unmanned Ground Vehicles (UGVs), which are capable of traveling on the ground in an unmanned state, have been used in a variety of fields. When a UGV travels along a pre-set route, it is required to avoid collisions between the UGV and people because the UGV may interfere with people moving on the road that serves as the UGV's driving route (i.e., traveling route).

Patent Literature 1 discloses a certain method for controlling the operation of an unmanned ground vehicle traveling on a guideway installed in a factory or the like. In particular, Patent Literature 1 discloses technologies in which, when the unmanned ground vehicle is about to enter a specific route where it may collide with the other unmanned ground vehicle, a radio transmitter/receiver device determines whether or not a radio signal is being transmitted from the other unmanned ground vehicle regarding travel along the specific route, and when no radio signals are received, the unmanned ground vehicle is kept travelling while transmitting its own radio signals, and when radio signals are received, the unmanned ground vehicle is stopped until the signals are no longer being received.

LISTING OF REFERENCES

Non-Patent Literature

PATENT LITERATURE 1: Laid-open Publication of Japanese Patent Application No. 2002-169615 A

SUMMARY OF THE INVENTION

Problems to be Solved by the Invention

When the above UGVs are used as automatic delivery robots and applied to on-demand delivery of goods, the UGVs carrying the goods usually travel automatically on public or private roads, in parks, or inside buildings during the daytime, and thus may frequently interfere with a large number of unspecified people moving on the road.

In order to avoid collisions with a large number of unspecified people, assuming that UGVs are stopped each time, as in the technologies disclosed in Patent Literature 1, the UGVs are inevitably required to stop traveling frequently, making it difficult to complete the delivery of goods by the pre-set scheduled delivery time.

This could compromise user convenience and reduce the availability of UGVs in automated delivery services using UGVs.

Furthermore, since UGVs may travel at different speeds, the risk of collisions between the UGV and a person may also vary depending on the speed of the UGV.

Therefore, the present disclosure addresses problems to avoid collisions between unmanned ground vehicles and people more intuitively and reliably without excessively interrupting the automatic traveling of unmanned ground vehicles.

Solution to Problems

In order to solve the above mentioned problems, according to one aspect of the present disclosure, there is provided an interference controller apparatus, comprising one or more processors, at least one of the one or more processors being configured to perform: a position acquisition process for acquiring a first position at which an unmanned ground vehicle is positioned and a second position at which a wearable device worn by a user is positioned, respectively; a route information acquisition process for acquiring route information indicating a route on which the unmanned ground vehicle is to travel; a traveling property acquisition process for acquiring a property related to a traveling of the unmanned ground vehicle; a first signal generation process for generating a first signal for displaying, on the wearable device, a first image indicating a direction and a path that the unmanned ground vehicle is to travel based on the first position and the route information; a second signal generation process for generating a second signal for displaying, on the wearable device, a second image indicating a zone where an entry of a user wearing the wearable device is to be restricted, based on the first position, the second position, and the route information; and a transmission process for transmitting the first signal and the second signal to the wearable device, and the first signal generation process generating the first signal such that the first image dynamically changes to be displayed based on the property of the unmanned ground vehicle acquired by the traveling property acquisition process.

In order to solve the above mentioned problems, according to another aspect of the present disclosure, there is provided an interference controlling method, comprising: acquiring a first position at which an unmanned ground vehicle is positioned and a second position at which a wearable device worn by a user is positioned, respectively; acquiring route information indicating a route on which the unmanned ground vehicle is to travel; acquiring a property related to a traveling of the unmanned ground vehicle; generating a first signal for displaying, on the wearable device, a first image indicating a direction and a path that the unmanned ground vehicle is to travel based on the first position and the route information; generating a second signal for displaying, on the wearable device, a second image indicating a zone where an entry of a user wearing the wearable device is to be restricted, based on the first position, the second position, and the route information; and transmitting the first signal and the second signal to the wearable device, and in generating the first signal, the first signal being generated such that the first image dynamically changes to be displayed based on the property of the acquired unmanned ground vehicle.

In order to solve the above mentioned problems, according to yet another aspect of the present disclosure, there is provided an interference controller system, comprising one or more processors, at least one of the one or more processors being configured to perform: a position acquisition process for acquiring a first position at which an unmanned ground vehicle is positioned and a second position at which a wearable device worn by a user is positioned, respectively; a route information acquisition process for acquiring route information indicating a route on which the unmanned ground vehicle is to travel; a traveling property acquisition process for acquiring a property related to a traveling of the unmanned ground vehicle; a first signal generation process for generating a first signal for displaying, on the wearable device, a first image indicating a direction and a path that the unmanned ground vehicle is to travel based on the first position and the route information; a second signal generation process for generating a second signal for displaying, on the wearable device, a second image indicating a zone where an entry of a user wearing the wearable device is to be restricted, based on the first position, the second position, and the route information; and a transmission process for transmitting the first signal and the second signal to the wearable device, and the first signal generation process generating the first signal such that the first image dynamically changes to be displayed based on the property of the unmanned ground vehicle acquired by the traveling property acquisition process.

Advantageous Effect of the Invention

According to one aspect of the present disclosure, it makes it possible to avoid collisions between unmanned ground vehicles and people more intuitively and reliably without excessively interrupting the automatic traveling of unmanned ground vehicles.

The above mentioned and other not explicitly mentioned objects, aspects and advantages of the present invention will become apparent to those skilled in the art from the following embodiments (detailed description) of the invention by referring to the accompanying drawings and the appended claims.

BRIEF DESCRIPTION OF DRAWINGS

FIG. 7 is a flowchart illustrating an exemplary processing procedure of AR image display control processing performed by the AR glasses according to the present embodiment.

FIG. 8 is a block diagram illustrating an exemplary hardware configuration of the interference controller apparatus according to the present embodiment.

DESCRIPTION OF EMBODIMENTS

Figure 1:
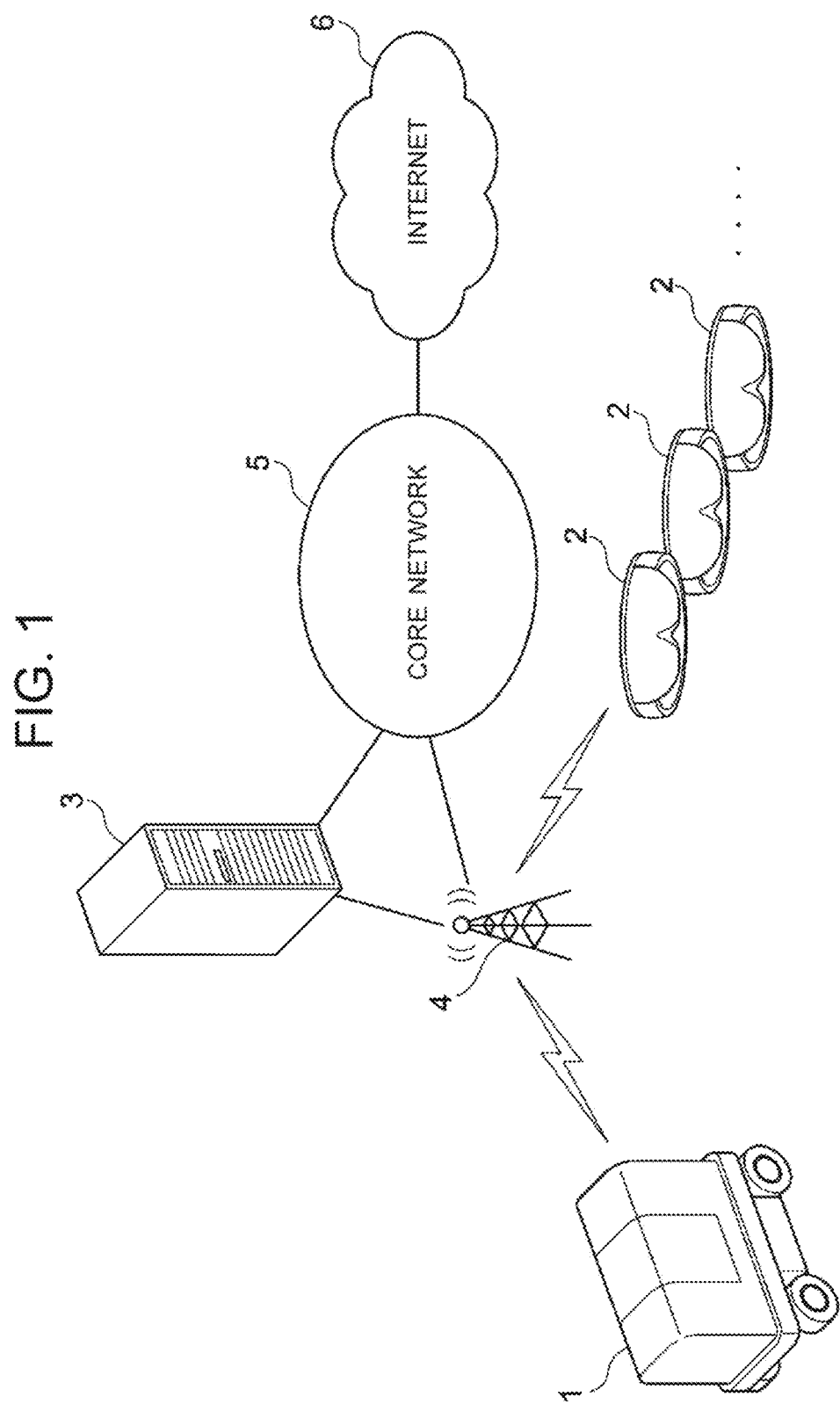
FIG. 1 is a schematic diagram illustrating an exemplary network configuration of a network system including an interference controller apparatus according to the present embodiment.

Hereinafter, embodiments of the present invention will be described in detail with reference to the accompanying drawings. Among the constituent elements disclosed herein, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

Hereinafter, a non-limiting example will be described in which an interference controller apparatus is implemented in a server apparatus capable of communicating with unmanned ground vehicles and wearable devices each worn by a user via a network, respectively. The interference controller apparatus according to the present embodiment generates a signal for displaying an image indicating the path of the unmanned ground vehicle and a signal for displaying an image indicating a danger zone based on position information and route information transmitted from the unmanned ground vehicle and position information transmitted from the wearable device, and transmits the generated signals for displaying images (hereinafter also referred to as "image display signals") to the wearable device to cause the wearable device to display images so as to enable a user wearing the wearable device to avoid an interference such as a collision with the unmanned ground vehicle.

Furthermore, hereinafter, a non-limiting example will be described in which the interference controller apparatus generates the image display signal such that the image indicating the path of the unmanned ground vehicle dynamically changes to be displayed on the wearable device, following changes in the traveling speed of the unmanned ground vehicle.

However, the present embodiment is not limited thereto. The interference controller apparatus according to the present embodiment may transmit a signal or a message for displaying an image to mobile devices carried by users.

Also, for example, the interference controller apparatus according to the present embodiment may generate the image display signal such that the image indicating the path of the unmanned ground vehicle dynamically changes to be displayed on the wearable device based on properties related to traveling of the unmanned ground vehicle, such as the priority on the traveling of the unmanned ground vehicle, congestion on the route, delivery delay status, or the like.

Also, all or part of the functions and configuration of the interference controller apparatus may be implemented in a wearable device worn by a user. Alternatively, all or a part of the functions and configuration of the interference controller apparatus may be implemented in an unmanned ground vehicle. In those cases, the unmanned ground vehicle and the wearable device may be configured to communicate with each other over a short distance using the Near Field Communication (NFC), Wi-Fi (registered trademark), or the like.

<Network Configuration of Network System Including Interference Controller Apparatus According to Present Embodiment>

FIG. 1 is a conceptual diagram illustrating an exemplary network configuration of a network system including the interference controller apparatus according to the present embodiment.

The system shown in FIG. 1 includes an unmanned ground vehicle 1, a wearable device 2, a controller server 3, a base station 4, and a core network 5. The core network 5 may further be connected to the Internet 6.

The unmanned ground vehicle 1 is an Unmanned Ground Vehicle (hereinafter referred to as "UGV") that is capable of traveling on the ground in an unmanned state without driver's driving operation. The UGV 1 is capable of autonomously traveling on the road according to a pre-set route.

According to the present embodiment, the UGV 1 is equipped with one or more loading spaces for loading and transporting packages and can be used for package delivery services, such as home delivery, or the like. The traveling of the UGV 1 may be controlled by a management server (not shown), which is capable of remotely operating the UGV 1 as appropriate. The management server may be implemented, for example, on the same server as the controller server 3, or alternatively the management server may be configured as an application server on the Internet 6. The UGV 1 is communicatively connected to the controller server 3 and the management server via the core network 5 of the mobile network and the Internet 6.

As a non-limiting example, assuming that a user wants to deliver a package purchased at a supermarket to his/her home by the UGV 1, the user sets the start and end points of the delivery by the UGV 1 via an application for using the UGV 1 and loads the purchased package onto the UGV 1. The management server calculates the route of the UGV 1 based on the start and end points of the delivery, the scheduled delivery time, the contents of the loaded package, map information, and the like, which have been set via the application and sends the calculated route to the UGV 1. The UGV 1 follows the route received from the management server and automatically travels on the road such as public roads, private roads, in parks, inside buildings, or the like.

The wearable device 2 is a portable device worn by a user. Hereinafter, a certain example will be described in which the wearable device 2 is Augmented Reality (AR) glasses.

The AR glasses 2 are a digital eyewear device equipped with a transmissive display for both eyes, a built-in camera, various sensors such as an audio sensor and a proximity sensor, which will be described later, and a projection unit. The AR glasses 2 generate an AR image based on information on a real space, which is recognized by various sensors, and project the generated AR image from the projection unit onto the transmissive display so that the AR image is superimposed on the real world that the user sees through the glasses. This provides users with the augmented reality.

The AR glasses 2 are communicatively connected to the controller server 3. The AR glasses 2 may further be communicatively connected to the UGV 1.

According to the present embodiment, the AR glasses 2 transmit the position information of the AR glasses 2 to the controller server 3, receive the image display signal of an AR image transmitted from the controller server 3, and project the AR image onto the transmissive display based on the received image display signal, information on the position, height and orientation, and the like, of the AR glasses 2 recognized by the AR glasses 2, and information on the surrounding environment.

The controller server 3 is constituted with a server apparatus or any computer. The controller server 3 is an apparatus that is connected to the UGV 1 and the AR glasses 2 via the mobile network including the base station 4 and the core network 5, or via any network including Wi-Fi access points, or the like, and has all or part of the configuration and functions of the interference controller apparatus.

When the UGV 1 is applied to the delivery service as described above, it is assumed that UGV 1 travels mainly during the daytime, which increases the probability that the UGV 1 will interfere with users who are walking or otherwise moving on the road.

According to the present embodiment, in order to alert the user moving on the road that the user may interfere with the UGV 1 and prompt the user to take action to avoid the collision with the UGV 1, the controller server 3 generates the image display signal for displaying an AR image for alert for attention on the display of the AR glasses 2, and transmits the generated image display signal to the AR glasses 2.

The controller server 3 may be a Multi-access Edge Computing (MEC) server deployed as an edge node in proximity to the UGV 1 and the AR glasses 2. In particular, when the traveling area of the UGV 1 is limited to within some short distance, by deploying the controller server 3 as the MEC server within or in proximity to the traveling area of the UGV 1, it makes it possible to improve real-time performance and reduce the load on the entire network.

Nevertheless, the controller server 3 may be deployed anywhere on the network, either on the core network 5 of the mobile network or in the cloud via the Internet 6.

The base station 4 is equipped with an antenna, a Remote Radio Head (RRH), and a Radio Interface Unit (RIU), which is a line termination device, and transmits and receives radio signals to/from the UGV 1 and the AR glasses 2, respectively, via the antenna of the base station 4.

The base station 4 serves as an edge node that constitutes the Radio Access Network (RAN) of the mobile network. The base station 4 receives attach requests from the UGV 1 and the AR glasses 2, respectively, and connects the UGV 1 and the AR glasses 2 to the core network 5 via a fronthaul network and a backhaul network, and relays data transmission between the UGV 1/AR glasses 2 and the controller server 3, and between the UGV 1 and the management server.

The core network 5 relays communications via base station 4 between the UGV 1/AR glasses 2 and the back-end Internet 6, respectively. The core network 5 may be either the 4G or 5G network, or any other generation of the mobile communication system.

It should be noted that the networks that are available to the UGV 1, the AR glasses 2, and the controller server 3 according to the present embodiment are not limited to the mobile networks described above, but may include the wireless LAN (Local Area Network) such as Wi-Fi, the wireless PAN (Personal Area Network) such as Bluetooth (registered trademark), ZigBee (registered trademark), UWB (Ultra Wide Band), and the wireless MAN (Metropolitan Area Network) such as WiMAX (registered trademark). Furthermore, the networks that are available to the UGV 1, the AR glasses 2, and the controller server 3 according to the present embodiment may include the wireless WAN (Wide Area Network) such as LTE/3G, 4G, and 5G. The networks need only be capable of communicatively connecting respective devices to each other to allow the respective devices to communicate with each other, and the communication standards, scale, and configuration are not limited to the above. Nevertheless, using the 5G or later generation mobile network, it makes it possible to enable lower latency and larger volume of data transmission, thereby improving the real-time performance of displaying AR images on the AR glasses 2.

The Internet 6 connects to the controller server 3 via the core network 5, and to the UGV 1 and the AR glasses 2 via the core network 5 and the base station 4, respectively, and provides back-end application functions to the controller server 3, the UGV 1 and the AR glasses 2, respectively.

It should be noted that the number of the UGVs 1, the AR glasses 2, the controller servers 3, and the base stations 4 is not limited to the number shown in FIG. 1, and each may be multiple.

<Functional Configurations of Controller Server, UGV, and AR Glasses>

Figure 2:
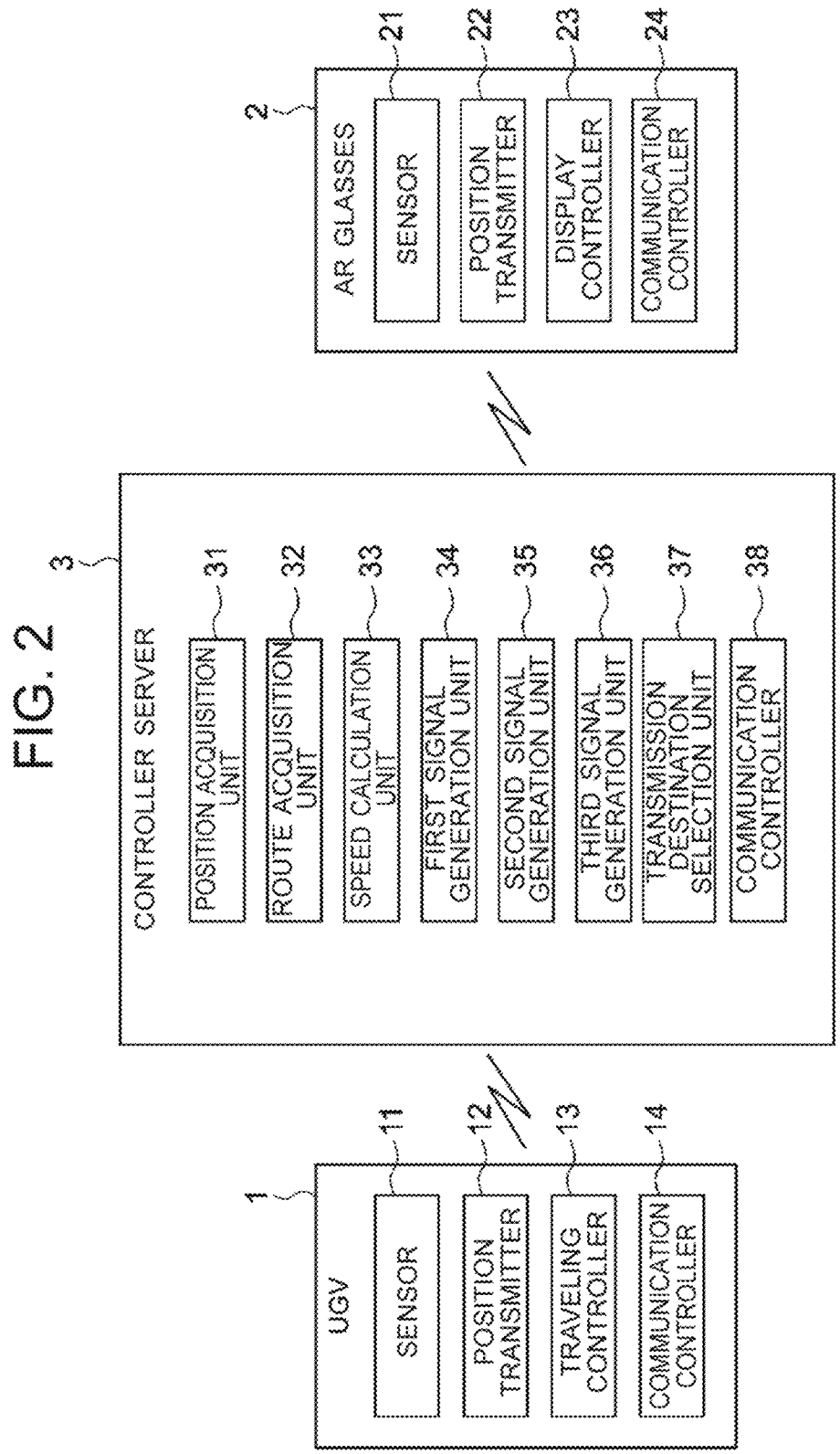
FIG. 2 is a block diagram illustrating an exemplary internal configuration of the interference controller apparatus according to the present embodiment.

FIG. 2 is a block diagram illustrating exemplary functional configurations of the controller server 3, the UGV 1, and the AR glasses 2 constituting the interference control system according to the present embodiment.

Among the respective functional modules of the controller server 3, the UGV 1, and the AR glasses 2 shown in FIG. 2, as for the functions that are implemented by software, those functions may be implemented by storing the program to provide the functions of each functional module in a ROM or any other memories, and allowing a CPU or any other circuitries to read the programs into a RAM to execute the programs. As for the functions that are implemented in hardware, for example, a dedicated circuit may be automatically generated on a Field Programmable Gate Array (FPGA) from the programs to provide the function of respective function modules by using a predetermined compiler. Alternatively, it is also possible to form a Gate Array circuit in the same way as the FPGA and implement it by hardware. Yet alternatively, those functions may be implemented by an Application Specific Integrated Circuit (ASIC). The configuration of the functional blocks shown in FIG. 2 is no more than an example, and multiple functional blocks may constitute a single functional block, or any of the functional blocks may be divided into blocks that perform multiple functions.

Referring to FIG. 2, the control server 3, which serves as the interference controller apparatus, includes a position acquisition unit 31, a route acquisition unit 32, a speed calculation unit 33, a first signal generation unit 34, a second signal generation unit 35, a third signal generation unit 36, a transmission destination selection unit 37, and a communication controller 38.

The position acquisition unit 31 acquires the position information indicating the position of the UGV 1, which is transmitted from the UGV 1, as well as the position information indicating the position of the AR glasses 2, which is transmitted from the AR glasses 2, and supplies the acquired position information of the UGV 1 and the AR glasses 2 to the subsequent first signal generation unit 34, the second signal generation unit 35, and the transmission destination selection unit 37, respectively.

The UGV 1 sequentially performs positioning of the UGV 1, and as the UGV 1 travels, the measured position information of the UGV 1 is also sequentially updated and sequentially transmitted to the controller server 3.

Similarly, the AR glasses 2 sequentially perform positioning of the AR glasses 2, and as AR glasses 2 travel, the measured position information of the AR glasses 2 is also sequentially updated and sequentially transmitted to the controller server 3.

The position acquisition unit 31 sequentially acquires the position information transmitted sequentially from the UGV 1 and the AR glasses 2, respectively, and sequentially supplies the acquired position information to the subsequent first signal generation unit 34, the second signal generation unit 35, and the transmission destination selection unit 37, respectively.

The position acquisition unit 31 may track the respective position of the UGV 1 and the AR glasses 2 by sequentially acquiring the position information transmitted from the UGV 1 and the AR glasses 2, respectively, at a frequency of, for example, several times to several hundred times per millisecond.

The route acquisition unit 32 acquires the route information indicating the route that UGV1 is to travel automatically. More specifically, the route acquisition unit 32 may acquire the route information of the UGV 1 from the UGV 1 or the management server that manages the traveling of the UGV 1. The route information of the UGV 1 includes the location of loading the package to be loaded on the UGV 1 (i.e., route start point), the location of the delivery destination of the package (i.e., route end point), and the traveling route from the route start point to the route end point.

The route acquisition unit 32 may further acquire from the UGV 1 or the management server the scheduled delivery time of the package to be loaded on the UGV 1, the contents of the package, the map information, and the like, in connection with the route information of the UGV 1.

The speed calculation unit 33 calculates the speed of the UGV 1 that is automatically traveling along the route. More specifically, the speed calculation unit 33 may acquire the current speed of the UGV 1 from the UGV 1 or the management server that manages the traveling of the UGV 1. Alternatively, the speed calculation unit 33 may sequentially calculate the speed of the UGV 1 based on changes in position information sequentially transmitted from the UGV 1.

Furthermore, the speed calculation unit 33 may acquire the priority on the traveling of the UGV 1, the congestion status of the route, the delay status of delivery, and the like, from the UGV 1 or the management server that manages the traveling of the UGV 1. In other words, the speed calculation unit 33 may acquire the traveling speed of the UGV 1, the priority on the traveling of the UGV 1, the congestion status of the route, the delay status of delivery, and the like, as properties related to the traveling of the UGV 1.

The first signal generation unit 34 generates a first image display signal for displaying a first AR image on the AR glasses 2.

More specifically, the first signal generation unit 34 refers to the map information based on the position information and the route information of the UGV 1, generates the first image display signal, and supplies the generated first image display signal to the communication controller 38.

The first AR image refers to an AR image that indicates the path and direction of travel of the UGV 1 automatically traveling on the pre-set route, and the details thereof will be described below with reference to FIGS. 4 to 6.

According to the present embodiment, the first signal generation unit 34 may generate the first image display signal such that the first AR image dynamically changes, following changes in the speed of the UGV 1 calculated by the speed calculation unit 33 or based on other properties related to the traveling of the UGV 1.

The second signal generation unit 35 generates a second image display signal for displaying a second AR image on the AR glasses 2.

More specifically, the second signal generation unit 35 refers to the map information based on the position information and the route information of the UGV 1 and the position information of the AR glasses 2, generates the second image display signal, and supplies the generated second image display signal to the communication controller 38.

The second AR image refers to an AR image that indicates a danger zone where the collision between the UGV 1 and a user wearing the AR glasses 2 is in particular to be avoided throughout the path of the UGV 1 automatically traveling on a pre-set route, and the details thereof will be described below with reference to FIGS. 4 and 5.

According to the present embodiment, the second signal generation unit 35 may generate the second image display signal such that the second AR image dynamically changes, following changes in the speed of the UGV 1 calculated by the speed calculation unit 33 or based on other properties related to the traveling of the UGV 1.

The third signal generation unit 36 generates a third image display signal for displaying a third AR image on the AR glasses 2.

More specifically, the third signal generation unit 36 generates the third image display signal based on the position information and the route information of the UGV 1 and the position information, the orientation and the posture of the AR glasses 2, and supplies the generated third image display signal to the communication controller 38.

The third AR image refers to an AR image to alert a user that the UGV1 is traveling in the vicinity of the AR glasses 2 when the UGV 1 is outside the viewing angle of the AR glasses 2.

The transmission destination selection unit 37 selects the AR glasses 2 as the transmission destination to which the second image display signal generated by the second signal generation unit 35 is to be transmitted.

More specifically, the transmission destination selection unit 37 selects, among multiple pairs of AR glasses 2 for which the position information has been acquired, the AR glasses 2 of which relative distance is within the predetermined distance threshold based on the relative positions of respective AR glasses 2 to one or more of the position information of the UGV 1 and the path of the UGV 1, as the transmission destination of the second image display signal.

The transmission destination selection unit 37 may further select, among multiple pairs of AR glasses 2 for which the position information has been acquired, the AR glasses 2 of which relative distance is within the predetermined distance threshold based on the relative positions of respective AR glasses 2 to one or more of the position information of the UGV 1 and the path of the UGV 1, as the transmission destination of the first image display signal. In this case, the predetermined distance threshold for transmitting the first image display signal may be greater than the distance threshold for transmitting the second image display signal.

The transmission destination selection unit 37 may further select, based on the orientation and the posture of the AR glasses 2, the AR glasses 2 in which either the UGV 1 traveling or the path of the UGV 1 is outside the viewing angle thereof as the transmission destination for the third image display signal, from among multiple pairs of AR glasses 2 of which relative distances are within the predetermined distance threshold based on the relative positions of respective AR glasses 2 to one or more of the position information of the UGV 1 and the path of the UGV 1. In this case, the predetermined distance threshold for transmitting the third image display signal may be the same as or different from either the distance threshold for transmitting the second image display signal or the distance threshold for transmitting the first image display signal.

As a result, both of the first AR image and the second AR image are displayed on the AR glasses 2 worn by users who have a high probability of colliding with the UGV 1, while only the first AR image is displayed on a larger number of AR glasses 2 worn by a larger number of users who are located in a wider area. Accordingly, it makes it possible to avoid displaying the danger zone for users who have a relatively low probability of colliding with the UGV 1, which is essentially unnecessary for alerting those users, so as not to excessively restrict those users' walking and movement.

Furthermore, in some cases, for some users who are close to the UGV 1 or the path of the UGV 1, the UGV 1 or the path of the UGV 1 is nevertheless outside of the viewing angle of the AR glasses 2 worn by such users, as such users are facing in a different direction. According to the present embodiment, even for such users, it makes it possible to alert users that the UGV 1 is approaching and prompt users to take action or move to avoid the collision with the UGV 1.

The communication controller 38 controls communications with the UGV 1, the AR glasses 2, and the management server, respectively.

According to the present embodiment, the communication controller 38 communicates with the UGV 1 and the AR glasses 2 in real time, receives position information from the UGV 1 and the AR glasses 2, respectively, and transmits the first image display signal, the second image display signal, and the third image display signal, which are generated by the first signal generation unit 34, the second signal generation unit 35, and the third signal generation unit 36, respectively, to the AR glasses 2 selected by the transmission destination selection unit 37.

Referring to FIG. 2, the UGV 1, which is an unmanned ground vehicle capable of carrying packages, is equipped with a sensor 11, a position transmitter 12, a traveling controller 13, and a communication controller 14.

The sensor 11 may include an on-board camera, an audio sensor, a proximity sensor, an Inertial Measurement Unit (IMU), or the like. The IMU may include an accelerometer to detect translational motion and a gyro sensor to detect rotational motion.

The sensor 11 may detect the position, speed, direction, and the like, of the UGV 1, at a frequency of, for example, several times to several hundred times per millisecond, and supply the various sensor data detected to the position transmitter 12 and the traveling controller 13.

The sensor 11 may detect the exact position of the UGV 1 by combining position information acquired from the IMU, the on-board camera, the Global Positioning System (GPS) or Global Navigation Satellite System (GNSS), as appropriate.

The position transmitter 12 sequentially transmits position information indicating the current position of the UGV 1 supplied from the sensor 11 to the controller server 3 via the communication controller 14. The position transmitter 12 may further transmit information on the speed, orientation, and the like, of the UGV 1 supplied from the sensor 11 to the controller server 3 in association with the position information.

The traveling controller 13 controls the UGV 1 to automatically travel from the route start point to the route end point along the route pre-set for the UGV 1.

More specifically, the traveling controller 13 may control the UGV 1 to travel so as to optimize the automatic traveling of the UGV 1 based on information on the UGV 1, such as the current position, speed, and orientation of the UGV 1 supplied from the sensor 11, and environmental information such as temperature, humidity, and road congestion around the UGV 1.

The traveling controller 13 may also receive various commands from the management server or the controller server 3, such as acceleration or deceleration commands, stop or resume traveling commands, detour commands, or the like, via the communication controller 14, and control the automatic traveling of the UGV 1 based on the received various commands.

The communication controller 14 controls communications between the UGV 1 and external devices such as the controller server 3, the management server, the AR glasses 2, or the like, and transmits and receives various data.

The AR glasses 2, which serve as a wearable device capable of projecting various AR images on their display according to the image display signals for displaying AR images transmitted from the controller server 3, are equipped with a sensor 21, a position transmitter 22, a display controller 23, and a communication controller 24.

The sensor 21 may include, similarly to the sensor 11 of the UGV 1, a built-in camera, an audio sensor, a proximity sensor, the IMU, or the like. The IMU may include an accelerometer to detect translational motion and a gyro sensor to detect rotational motion.

The sensor 21 may detect the position, speed, direction, and the like, of the AR glasses 2, at a frequency of, for example, several times to several hundred times per millisecond, and supply the various sensor data detected to the position transmitter 22 and the display controller 23.

The sensor 21 may detect the exact position of the AR glasses 2 by combining position information acquired from the IMU, the built-in camera, the GPS or GNSS, as appropriate.

The position transmitter 22 sequentially transmits position information indicating the current position of the AR glasses 2 supplied from the sensor 21 to the controller server 3 via the communication controller 24. The position transmitter 22 may further transmit to the controller server 3 information on the posture, speed, orientation, height, and the like, of the AR glasses 2 supplied from the sensor 21, as well as information on the surrounding environment of the AR glasses 2, in association with the position information.

The display controller 23 projects AR images on the transmissive display of the AR glasses 2 based on the information on the position, posture, orientation, height, and the like, of the AR glasses 2 detected by the sensor 21 and the information on the surrounding environment of the AR glasses 2.

According to the present embodiment, the display controller 23 further receives, via the communication controller 24, the first image display signal for displaying the first AR image and the second image display signal for displaying the second AR image transmitted from the controller server 3, and analyzes the received first and second image display signals. Based on the analysis results of the first and second image display signals, the display controller 23 causes the first AR image, which indicates the path and the direction of travel of the UGV 1, and the second AR image, which indicates the danger zone on the path of the UGV 1, to be displayed on the display of the AR glasses 2, preferably within the viewing angle of the AR glasses 2.

Furthermore, the display controller 23 receives, via the communication controller 24, the third image display signal for displaying the third AR image transmitted from the controller server 3, and analyzes the received third image display signal. Based on the analysis results of the third image display signal, the display controller 23 causes the third AR image to be displayed on the display of the AR glasses 2, preferably at the approximate center position of the viewing angle, to alert the user that the UGV 1 is traveling in the vicinity of the AR glasses 2.

The third AR image may be any virtual object, but may be any moving image, for example, pointing in the direction from which the UGV 1 is approaching or moving toward the approximate center position of the viewing angle from that direction, so that the user can recognize from which direction the UGV 1 is approaching outside the viewing angle of the AR glasses 2.

The communication controller 24 controls communications between the AR glasses 2 and external devices such as the controller server 3 and the UGV 1, and transmits and receives various data.

<Processing Procedure of Interference Control Processing Performed by Controller Server>

Figure 3:
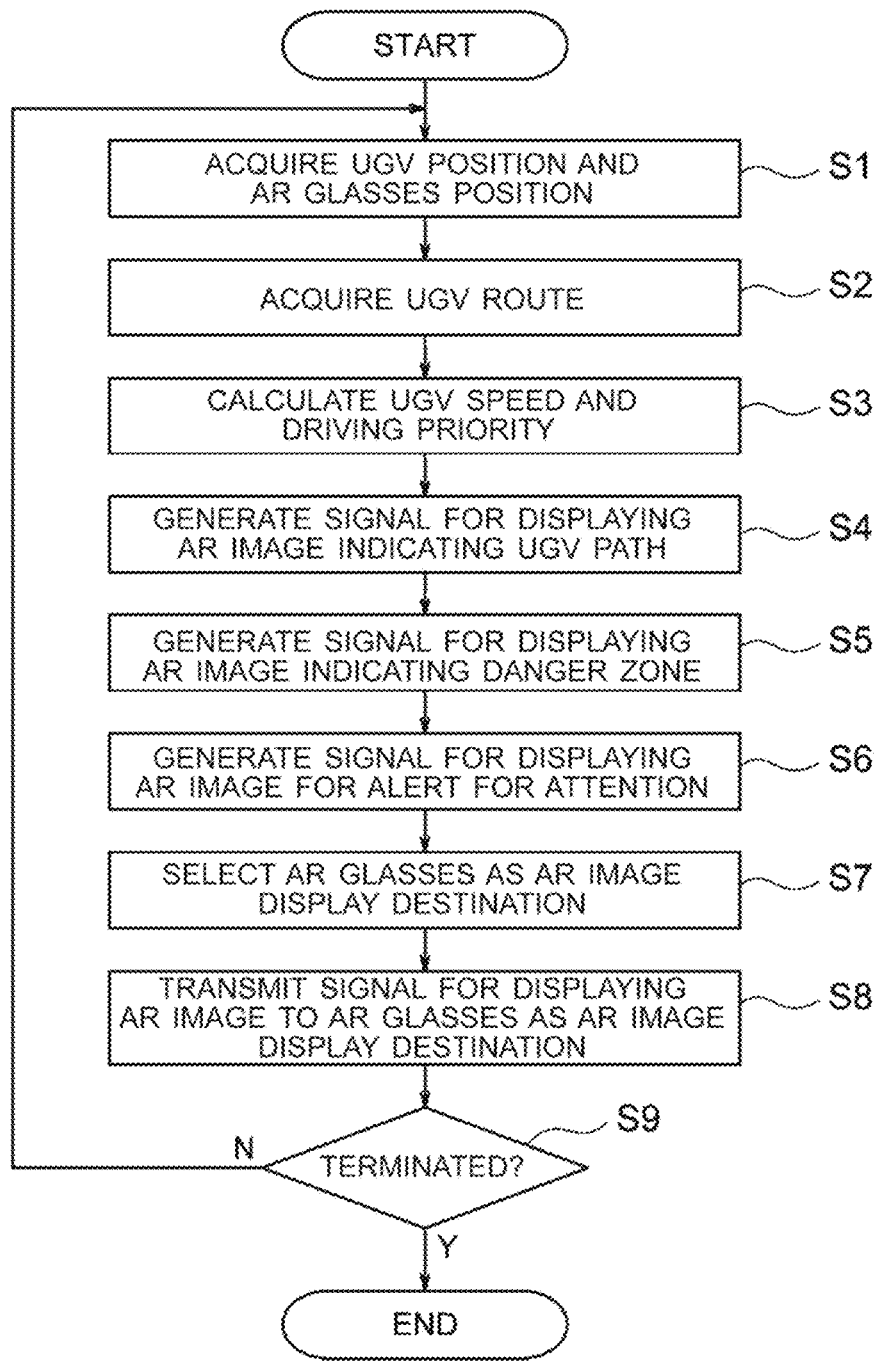
FIG. 3 is a flowchart illustrating an exemplary processing procedure of interference control processing performed by the interference controller apparatus according to the present embodiment.

FIG. 3 is a flowchart illustrating an exemplary processing procedure of the interference control processing performed by the controller server 3. Referring to FIG. 3, the interference control processing is performed by respective components of the controller server 3, which serves as the interference controller apparatus.

In step S1, the position acquisition unit 31 of the controller server 3, which serves as the interference controller apparatus according to the present embodiment, receives the position information of the UGV 1 transmitted from the UGV 1 and the position information of the AR glasses 2 transmitted from the AR glasses 2 via the communication controller 38.

UGV1 is assumed to be automatically traveling along the route pre-set by the management server from the route start point to the route end point in order to deliver loaded packages. On the other hand, the AR glasses 2 are worn by a user and move to follow the user's movement by walking, or the like.

The position acquisition unit 31 sequentially tracks the positions of the UGV 1 and the AR glasses 2 based on the position information transmitted from the UGV 1 and the AR glasses 2, respectively, and sequentially updates the positions of the UGV 1 and the AR glasses 2, respectively. The position acquisition unit 31 may receive from the UGV 1 information such as the speed and the direction of the UGV 1, in connection with the position information of the UGV 1. The position acquisition unit 31 may also receive from the AR glasses 2 information such as the posture, speed, orientation, height, and the like, of the AR glasses 2 and information on the surrounding environment of the AR glasses 2 in connection with the position information of the AR glasses 2.

In step S2, the route acquisition unit 32 of the controller server 3 acquires the route information of the UGV 1 from the UGV 1 or the management server that manages the traveling of the UGV 1. The route information of the UGV 1, which is pre-set to the UGV 1, includes the location of the loading package to be loaded on the UGV 1 (i.e., route start point), the location of the package delivery destination (i.e., route end point), and the traveling route from the route start point to the route end point. For the return trip of the delivery, the route information includes the location of the package delivery destination (i.e., route start point), the location of the facility to which the UGV 1 is to return (i.e., route end point), and the traveling route from the route start point to the route end point.

The route acquisition unit 32 may further acquire from the UGV 1 or the management server the scheduled delivery time of the package to be loaded on the UGV 1, the contents of the package, map information, and the like, in connection with the route information of the UGV 1.

By referring to the map information, the controller server 3 is able to map the delivery route of the UGV 1, the current position of the UGV 1, and the path and the direction of travel of the UGV 1 onto a map, as well as acquire or calculate the danger zone that may lie on the path of the UGV 1.

In step S3, the speed calculation unit 33 of the controller server 3 calculates the speed of the UGV 1 automatically traveling along the route as the property related to the traveling of the UGV 1. The speed calculation unit 33 may further acquire, as properties related to the traveling of the UGV 1, the priority on the traveling of the UGV 1, the congestion status of the route, the delay status of delivery, and the like, from the UGV 1 or the management server that manages the traveling of the UGV 1.

In step S4, the first signal generation unit 34 of the controller server 3 generates the first image display signal for displaying the first AR image on the AR glasses 2. The first AR image refers to an AR image indicating the path and the direction of travel of the UGV 1 traveling on the pre-set route.

More specifically, the first signal generation unit 34 refers to the map information based on the position information of the UGV 1 acquired by the position acquisition unit 31 in step S1 and the route information acquired by the route acquisition unit 32 in step S2, and generates the first image display signal.

In step S5, the second signal generation unit 35 of the controller server 3 generates the second image display signal for displaying the second AR image on the AR glasses 2. The second AR image refers to an AR image indicating the danger zone that may lie on the path of the UGV 1 traveling on the pre-set route.

More specifically, the second signal generation unit 35 refers to the map information based on the position information of the UGV 1 and the position information of the AR glasses 2 acquired by the position acquisition unit 31 in step S1 and the route information acquired by the route acquisition unit 32 in step S2, and generates the second image display signal.

Figure 4:
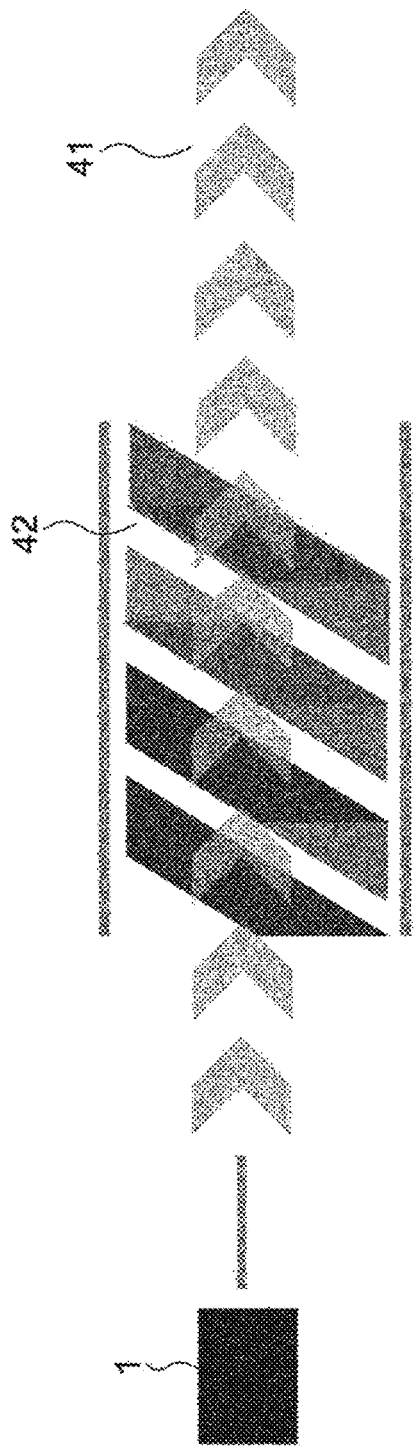
FIG. 4 is a schematic diagram illustrating an exemplary display image to be displayed on a display of AR glasses in which an AR image indicating the path of a UGV and an AR image indicating a static danger zone are superimposed.

FIG. 4 is a schematic diagram illustrating an exemplary display image of an AR image to be displayed on a display of the AR glasses 2, in which the AR image indicating the path of the UGV 1 and the AR image indicating the static danger zone are superimposed.

Referring to FIG. 4, it is assumed that the UGV 1 is automatically travelling from the left side of the paper to the right side within the viewing angle of the display of the AR glasses 2. The UGV 1 and the road surface, structures, and the like, around the UGV 1 are assumed to be seen as real objects and are visible by a user through the transmissive display of the AR glasses 2.

The first AR image 41 is an AR image that indicates the path and the direction of travel that the UGV 1 is assumed to automatically travel. Referring to FIG. 4, the direction of arrows of the first AR image 41 indicates the direction of travel of the UGV 1. The arrows of the first AR image 41 may be displayed to move, for example, in the direction of travel, respectively, and the speed of movement of respective arrows may vary to follow changes in the speed of the UGV 1. The first AR image 41 may be projected onto the display of the AR glasses 2 such that the first AR image 41 is superimposed on the road surface that is the path of the UGV 1. This allows users to readily recognize which part of the road surface, which is a real object in the field of view of the AR glasses 2, is the path of the UGV 1.

On the other hand, the second AR image 42 is an AR image that indicates the danger zone that may lie on the path of the UGV 1. Referring to FIG. 4, the second AR image 41 indicates the danger zone that lies statically on the path of UGV 1.

Referring to FIG. 4, the danger zone is a static zone where the probability of interference between the UGV 1 and a user may be determined to be typologically high based on the map information, time of day, congestion, or the like, and may include, for example, an intersection for users to cross a road. By displaying the second AR image 42 indicating such a danger zone on the display of the AR glasses 2 worn by the user while walking, it makes it possible to prompt the user to move or take action to avoid the collision with the UGV 1 without decelerating or stopping the UGV 1.

The second AR image 42 may be controlled to be displayed such that the second AR image 42 is superimposed on the first AR image 41, and the color, texture, and motion of the AR image may be set as appropriate such that the first AR image 41 and the second AR image 42 are visually distinguishable from each other when superimposed.

The second AR image 42 may also be displayed on the display of the AR glasses 2 at a time when the UGV 1 automatically traveling on the route is approaching within a predetermined distance threshold from the danger zone, and may be controlled to be hidden on the display of the AR glasses 2 at a time when the UGV 1 that has passed the danger zone becomes distant from the danger zone beyond a predetermined distance threshold.

Figure 5:
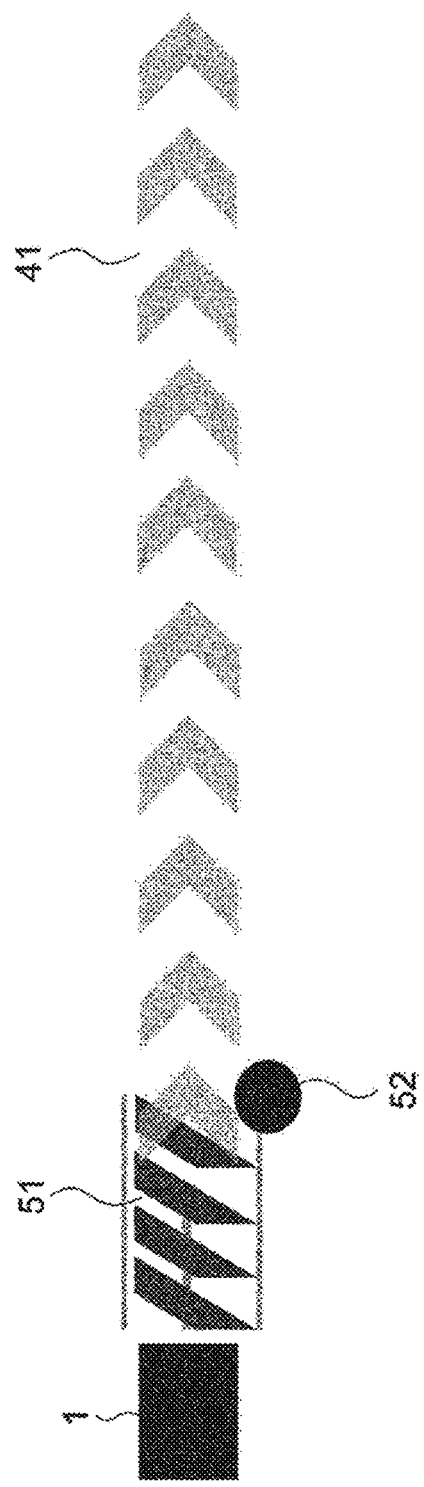
FIG. 5 is a schematic diagram illustrating an exemplary display image to be displayed on a display of AR glasses in which the AR image indicating the path of a UGV and an AR image indicating a dynamic danger zone are superimposed.

FIG. 5 is a schematic diagram illustrating an exemplary display image of an AR image to be displayed on the display of the AR glasses 2, in which an AR image indicating the path of the UGV 1 and an AR image indicating a dynamic danger zone are superimposed.

Referring to FIG. 5, similarly to FIG. 4, it is assumed that the UGV 1 is automatically traveling from the left side of the paper to the right side within the viewing angle of the display of the AR glasses 2. The UGV 1 and the road surface and structures around the UGV 1 are assumed to be seen as real objects and visible by the user through the transmissive display of the AR glasses 2.

The first AR image 41 is an AR image that indicates the path and the direction of travel that the UGV1 is assumed to automatically travel, and similarly to FIG. 4, may be display-controlled to be projected on the display of the AR glasses 2.

On the other hand, the second AR image 51 is an AR image that indicates the danger zone that may lie on the path of the UGV 1. Referring to FIG. 5, the second AR image 51 indicates the danger zone that is dynamically generated on the path of the UGV 1, depending on the relative distance to the user 52.

Referring to FIG. 5, the danger zone is a dynamically set zone where the probability of interference between the UGV 1 and the user 52 may be determined to be high based on the relative positional relationship between the UGV 1 and the user 52, and may be, for example, a zone that is set on the path of the UGV 1 between the UGV 1 and the user 52 when the relative distance between the UGV 1 and the user 52 gets closer within a predetermined distance threshold. By displaying the second AR image 51 indicating such a danger zone on the display of the AR glasses 2 worn by the user while walking, it makes it possible to prompt the user to move or take action to avoid the collision with the UGV 1 without decelerating or stopping the UGV 1.

The second AR image 51 may be, similarly to the second AR image 42 shown in FIG. 4, controlled to be displayed such that the second AR image 51 is superimposed on the first AR image 41, and the color, texture, and motion of the AR image may be set as appropriate such that the first AR image 41 and the second AR image 51 are visually distinguishable from each other when superimposed.

The second AR image 51 may also be controlled to be displayed such that the second AR image 51 is displayed on the display of the AR glasses 2 of the user 52 when the user 52 attempts to cross the path of the UGV 1 according to the direction of travel of the user 52 that may be determined from the posture and the direction of travel of the AR glasses 2. In other words, the second AR image 51 may be controlled to be hidden on the display of the AR glasses 2 when the user 52 is determined not to interfere with the path of the UGV 1 based on the posture and the direction of travel of the user 52, even when the user 52 is close to the UGV 1 within the predetermined distance threshold. The second AR image 51 may also be displayed on the display of the AR glasses 2 at a time when the UGV 1 automatically traveling on the route gets close to the user 52 within the predetermined distance threshold, and may be controlled to be hidden, in other words, to be stopped being displayed, on the display of the AR glasses 2 at a time when the UGV 1 becomes distant from the user 52 beyond the predetermined distance threshold. This makes it possible to keep the alert for attention for avoiding the collision with the UGV 1 only to users who are in a state of high probability of the collision with the UGV 1.

Furthermore, the second AR image 51 is an AR image to be displayed on the display of the AR glasses 2 when the probability of a particular user 52 colliding with the UGV 1 is higher as compared to the static second AR image 42 shown in FIG. 4. Therefore, the second AR image 51 may be displayed with higher brightness on the display of the AR glasses 2, with a warning message being superimposed thereon, with a warning sound being output simultaneously, in order to prompt the user 52 to move or take action to avoid the collision with the UGV 1 immediately.

Figure 6:
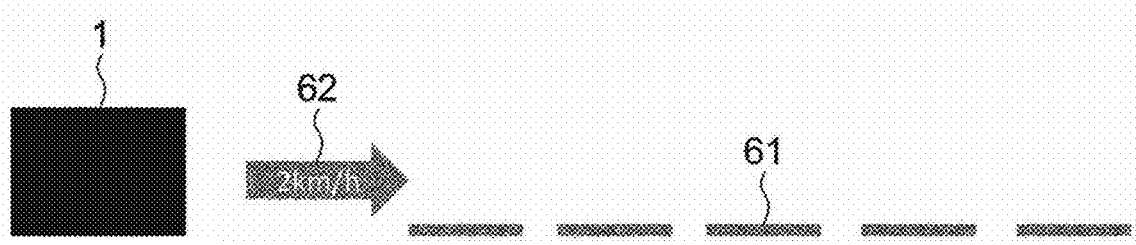
FIG. 6 is a schematic diagram illustrating an exemplary display image to be displayed on a display of AR glasses in which the AR image indicating the path of a UGV dynamically changes as the UGV's traveling speed changes.

FIG. 6 is a schematic diagram illustrating an exemplary display image to be displayed on the display of the AR glasses in which the AR image indicating the path of the UGV dynamically changes as the traveling speed of the UGV changes.

According to the present embodiment, the first AR image is controlled to be displayed such that the first AR image dynamically changes to be projected onto the display of the AR glasses 2, following changes in the traveling speed of the UGV 1.

Referring to FIG. 6, the first AR image 61 indicating the path and the direction of travel of the UGV 1 is displayed with a narrower width relative to the direction of travel than the first AR image 41 shown in FIGS. 4 and 5. Here, the traveling speed of the UGV 1 shown in FIG. 6 is assumed to be relatively slower than the traveling speed of the UGV 1 shown in FIGS. 4 and 5. Thus, the first AR image may be controlled to be displayed to follow changes in the traveling speed of the UGV 1 such that the higher the traveling speed of the UGV 1, the wider the width of the first AR image. As a result, the higher the probability of the collision with the UGV 1, the higher the visibility of the first AR image.

In addition, the current traveling speed of the UGV 1 may be superimposed on the AR image 62, as the other AR image 62 shown in FIG. 6, which indicates the direction of travel of the UGV 1.

It should be noted that the display control of the first AR images 41 and 61 following changes in the traveling speed of the UGV 1 is not limited to changes in width, but may be realized by changing any display attribute. For example, the first AR images 41 and 61 may have a more acute angle of the arrow indicating the direction of travel, increase in brightness, or increase in speed flowing toward the direction of travel, as the traveling speed of the UGV 1 increases.

Furthermore, the first AR images 41 and 61 may be controlled to be displayed such that the higher the priority on the traveling of the UGV 1, the more visible the first AR images 41 and 61, for example, the wider the first AR images 41 and 61. The priority of the UGV 1 may be set in advance when setting up the delivery, or may be determined as appropriate according to the nature of the package to be delivered (perishable or frozen goods, or the like). Similarly, the first AR images 41 and 61 may be controlled to be displayed to be more visible when arrival at the delivery destination is likely to be delayed, depending on the congestion on the route of the UGV 1 and the delay in delivery. Accordingly, when the traveling of the UGV 1 is to be given higher priority, it makes it possible to prompt users more reliably to take action or move to avoid the collision with the UGV1 so as to avoid deaccelerating or stopping the UGV 1.

Similarly to the first AR images 41 and 61, the second AR images 42 and 51 may be controlled to be displayed such that the second AR images dynamically changes to be projected onto the display of the AR glasses 2, following changes in the traveling speed of the UGV 1, or based on the properties such as the priority on the traveling of the UGV 1. For example, the second AR images 42 and 51 may be displayed such that the higher the traveling speed of the UGV 1 or the higher the priority on traveling of the UGV 1, the greater the width or length of the second AR images 42 and 51 relative to the direction of travel so as to increase the visibility of the second AR images 42 and 51.

Referring back to FIG. 3, in step S6, the third signal generation unit 36 of the controller server 3 generates a third signal for displaying a third AR image on the AR glasses 2. The third AR image refers to an AR image to alert a user that the UGV 1 is traveling in the vicinity of the AR glasses 2 when the UGV 1 is outside the viewing angle of the AR glasses 2.

More specifically, the third signal generation unit 36 generates the third image display signal based on the position information and the route information of the UGV 1 and the position information and the orientation or the posture of the AR glasses 2.

In step S7, the transmission destination selection unit 37 of the controller server 3 selects the AR glasses 2 as the destination to which the second image display signal generated in step S5 is to be transmitted (hereinafter also referred to as "transmission destination"). The transmission destination selection unit 37 may further select the AR glasses 2 as the destination to which the first image display signal generated in step S4 is to be transmitted, and the AR glasses 2 as the destination to which the third image display signal generated in step S6 is to be transmitted, respectively.

More specifically, the transmission destination selection unit 37 may set the transmission destination of the second image display signal generated in step S5 to all pairs of AR glasses 2 of which position information has been acquired in step S1, or alternatively the transmission destination selection unit 37 may selectively set the transmission destination to the AR glasses 2 that are close to the UGV 1 or the danger zone within a predetermined distance threshold (i.e., second threshold). Yet alternatively, the transmission destination selection unit 35 may select the AR glasses 2 for which the path of the UGV 1 falls within the viewing angle of the AR glasses 2 based on the posture and the direction of travel of respective AR glasses 2 and set the selected AR glasses 2 to the transmission destination of the second image display signal.

The transmission destination selection unit 37 may further set the transmission destination of the first image display signal generated in step S4 to all pairs of AR glasses 2 of which position information has been acquired in step S1, or alternatively the transmission destination selection unit 37 may selectively set the transmission destination to the AR glasses 2 that are close to the UGV 1 or the path of the UGV 1 within a predetermined distance threshold (i.e., first threshold). Yet alternatively, the transmission destination selection unit 37 may select the AR glasses 2 for which the path of the UGV 1 falls within the viewing angle of the AR glasses 2 based on the posture and the direction of travel of respective AR glasses 2 and set the selected AR glasses 2 to the transmission destination of the first image display signal.

Here, it is preferable that the second threshold is to be smaller than the first threshold, but the second threshold may be greater than the first threshold. When the second threshold is smaller than the first threshold, both of the first AR image and the second AR image are to be displayed on the AR glasses 2 with a relatively small relative distance to the danger zone, while only the first AR image is to be displayed on the AR glasses 2 with a relatively large relative distance to the danger zone.

As such, it makes it possible to ensure the safety of users who have a high probability of colliding with the UGV 1 by immediately prompting such users to take action to avoid the collision with the UGV 1. On the other hand, it makes it possible to alert users located in a wider area to pay attention to the path of the UGV 1 and have such users change their walking route in advance as necessary, without forcing such users to take immediate action to avoid the collision.

The transmission destination selection unit 37 may further select, based on the orientation and the posture of the AR glasses 2, the AR glasses 2 in which either the UGV 1 traveling or the path of the UGV 1 is outside the viewing angle thereof as the transmission destination for the third image display signal, from among multiple pairs of AR glasses 2 of which relative distances are within the predetermined distance threshold based on the relative positions of respective AR glasses 2 to one or more of the position information of the UGV 1 and the path of the UGV 1.

In step S8, the transmission destination selection unit 37 transmits the first image display signal generated by the first signal generation unit 34 in step S4, the second image display signal generated by the second signal generation unit 35 in step S5, and the third image display signal generated by the third signal generation unit 36 in step S6, respectively, to the AR glasses 2, the transmission destination selected in step S7.

In step S9, the controller server 3 repeats the processes from step S1 to step S8 until the completion of the interference control processing shown in FIG. 3 is instructed. The completion of the interference control processing may be instructed via an input by an operator, or alternatively set automatically based on the delivery service time zone of the UGV 1.

Furthermore, the second signal generation unit 35 of the controller server 3 may transmit a stop command or a deceleration command to the UGV 1 to stop or decelerate the UGV 1 when the position of any of the AR glasses 2 is within a predetermined distance threshold (i.e., third threshold) from among multiple pairs of AR glasses 2 each displaying the second AR image indicating the danger zone. Here, the third threshold may be smaller than any of the first threshold and the second threshold. By setting the third threshold in this manner, it makes it possible to reduce the frequency at which the UGV 1 stops or decelerates to avoid the collision with users, while effectively avoiding the risk of an eventual collision between the UGV 1 and users.

<Processing Procedure of AR Image Display Processing Performed by AR Glasses>

FIG. 7 is a flowchart illustrating an exemplary processing procedure of the AR image display processing performed by the AR glasses 2.

In step S71, the sensor 21 of the AR glasses 2 detects the current position of the AR glasses 2.

More specifically, the sensor 21 may detect the position of the AR glasses 2 by combining position information acquired from the IMU, the built-in camera, the GPS or GNSS as appropriate, and supply the detected position to the position transmitter 22 and the display controller 23. The sensor 21 may further detect the posture, speed, orientation, and the like, of the AR glasses 2 and supply the detected various sensor data to the position transmitter 22 and the display controller 23.

In step S72, the position transmitter 22 of the AR glasses 2 transmits, as the position information, the current position of the AR glasses 2 detected by the sensor 21 in step S71 to the controller server 3 via the communication controller 24. The position transmitter 22 may transmit the position information of the AR glasses 2 to the controller server 3 every time the sensor 21 detects the current position of the AR glasses 2, for example, at a frequency of several times to several hundred times per millisecond. Alternatively, the position transmitter 22 may transmit the position information to the controller server 3 intermittently when the current detection position is different from the previous detection position and thus the AR glasses 2 is determined to have moved.

In step S72, when the position information of the AR glasses 2 is transmitted to the controller server 3 from the position transmitter 22 via the communication controller 24, the controller server 3 performs the interference control processing shown in FIG. 3, and generates the first image display signal, which is to display the first AR image on the AR glasses 2, the second image display signal, which is to display the second AR image on the AR glasses 2, and the third image display signal, which is to display the third AR image on the AR glasses 2, respectively.

When the first and second image display signals generated by the controller server 3 are transmitted from the communication controller 36 of the controller server 3, in step S72, the communication controller 24 of the AR glasses 2 receives the first and second image display signals from the controller server 3, respectively. In step S73, the communication controller 24 of the AR glasses 2 may further receive the third image display signal from the controller server 3.

In step S74, the display controller 23 of the AR glasses 2 analyzes the first, second, and third image display signals received in step S73, respectively.

More specifically, the display controller 23 analyzes the first, second, and third image display signals, respectively, and acquires the AR images to be displayed (i.e., the first AR image and the second AR image), the spatial coordinates where the AR images are to be displayed, information for display control including the display start condition and the display stop condition for the AR images, and the like, which are carried by the respective image display signals.

Subsequently, the display controller 23 adjusts the display position of the AR images based on the position, height, orientation and the viewing angle of the AR glasses 2 such that the AR image is superimposed at a predetermined position within the viewing angle of the display of the AR glasses 2 according to the acquired spatial coordinates, display start and stop conditions, and other information.

The predetermined position at which the first AR image indicating the path and the direction of travel of the UGV 1 is to be displayed may be, for example, the surface of a public or private road, the ground of an outdoor facility such as a park, and the floor of an indoor facility such as a shopping center or house, as shown in FIGS. 4 to 6.

The predetermined position at which the second AR image indicating the dangerous zone to which the user's entry is to be restricted may be, as shown in FIG. 4, a static position indicating a zone with a high probability that users are likely to enter or pass, such as an intersection, or, as shown in FIG. 5, a position indicating a dynamically set zone between the UGV 1 and a user who gets close to the UGV 1 within a predetermined distance threshold (i.e., second threshold).

The predetermined position at which the third AR image is to be displayed to alert a user that the UGV 1 is traveling in the vicinity of the AR glasses 2 may be, for example, at the approximate center position of the viewing angle of the AR glasses 2. Furthermore, the third AR image may be, for example, any moving image of an object pointing in the direction from which the UGV 1 is approaching or moving toward the approximate center position of the viewing angle from that direction, so as to allow the user to recognize from which direction the UGV 1 is approaching outside the viewing angle of the AR glasses 2.

In step S75, the display controller 23 of the AR glasses 2 projects the first AR image and the second AR image onto the above predetermined position within the viewing angle of the display of the AR glasses 2 based on the analysis results of the image display signals acquired in step S74. On the other hand, when the position where the first AR image or the second AR image is to be displayed becomes outside the viewing angle of the display of the AR glasses, the display controller 23 stops projecting the first AR image or the second AR image that is outside the viewing onto the display of the AR glasses 2.

The display controller 23 sequentially calculates the position on the display of the AR glasses 2 where the AR image is to be projected, following changes in the position, height, orientation, viewing angle, and the like, of the AR glasses 2. Some AR glasses 2 displays both the first AR image and the second AR image, another AR glasses 2 displays only the first AR image, and yet another AR glasses 2 displays neither the first AR image nor the second AR image, as the position, height, orientation, viewing angle, and the like, of the AR glasses 2 vary for each individual AR glasses 2 and change from time to time.

On the other hand, the third AR image is displayed at the approximate center position of the viewing angle of the AR glasses 2, even when the first and second AR images are outside the viewing angle of the AR glasses 2. Accordingly, it makes it possible to reliably alert the user of the approach of the UGV 1 regardless of the user's orientation or posture.

In step S76, the AR glasses 2 repeat the processes from step S71 to step S75 until the AR image display processing shown in FIG. 7 satisfies the completion condition. The completion of the AR image display processing may be triggered by the event, for example, that the AR glasses 2 are no longer worn, that no movement of the AR glasses 2 is detected for a predetermined time, or that the current position of the AR glasses 2 is at home or indoor that is not on the path of the UGV1, or may be determined based on the delivery service time zone of the UGV 1. In other words, the AR image display processing shown in FIG. 6 may be terminated on the condition that the AR glasses 2 are in a state where there is no or very low possibility of the collision between the UGV 1 and the user.

As described above, according to the present embodiment, the interference controller apparatus generates, based on the position information and the route information transmitted from the unmanned ground vehicle and the position information transmitted from the wearable device, an image display signal to display an image indicating the path of the unmanned ground vehicle and an image display signal to display an image showing the danger zone, and transmits the generated image display signals to the wearable device to cause the wearable device to display the images on the wearable device.

Furthermore, according to the present embodiment, the interference controller apparatus generates the image display signal for displaying the image indicating the path of the unmanned ground vehicle or the danger zone such that the image dynamically changes based on the property related to the traveling of the unmanned ground vehicle. Yet furthermore, the interference controller apparatus generates the image display signal for displaying the image on the wearable device even when the unmanned ground vehicle is outside the viewing angle of the wearable device.

As such, it makes it possible to improve the visibility of the image displayed on the wearable device and allows users to recognize the route, speed, and the like, of the unmanned ground vehicle more intuitively. Accordingly, as the risk of collision with the unmanned ground vehicle becomes greater, it makes it possible to increase alerts to users to pay attention.

As a result, it makes it possible to effectively avoid collisions between unmanned ground vehicles and people without excessively interrupting the automatic traveling of unmanned ground vehicles.

<Hardware Configuration of Interference Controller Apparatus>

FIG. 8 is a block diagram illustrating a non-limiting example of the hardware configuration of the controller server 3, which serves as the interference controller apparatus according to the present embodiment.

The interference controller apparatus 3 according to the present embodiment may be implemented in any single or a plurality of computers or any other processing platform.

As shown in FIG. 8, the interference controller apparatus 3 may include a CPU 81, a ROM 82, a RAM 83, an HDD 84, an input unit 85, a display unit 86, a communication I/F 87, and a system bus 88. The interference controller apparatus 3 may also be equipped with an external memory accessible locally or remotely.

The CPU (Central Processing Unit) 81 controls entire operations of the interference controller apparatus 3 in a comprehensive manner, and controls the operations of respective components 82 to 87 via the system bus 88, which serves as a data transmission path.

The ROM (Read Only Memory) 82 is a non-volatile memory that stores the control programs and the like necessary for the CPU 81 to execute the processing. Those programs may be stored in a non-volatile memory such as an HDD (Hard Disk Drive) 84, an SSD (Solid State Drive), or removable storage media (not shown).

The RAM (Random Access Memory) 83 is a volatile memory and functions as a main memory, a work area, or the like of the CPU 81. In other words, the CPU 81 loads the necessary programs and the like from the ROM 82 into the RAM 83 and executes the programs to realize various functional operations.

The HDD 84 stores, for example, various data and information necessary for the CPU 81 to perform processing using the programs. In addition, the HDD 84 stores, for example, various data and various information and the like obtained by the CPU 81 performing the processing using the programs and the like.

The input unit 85 is constituted with a pointing device such as a keyboard, a mouse, a capacitive or pressure-sensitive touch panel, or the like.

The display unit 86 is constituted with a monitor such as a liquid crystal display (LCD). The display unit 86 may provide a GUI (Graphical User Interface) that is used to input instructions to the interference controller apparatus 3 for various parameters used in the interference control processing, or the like, communication parameters used in communication with other devices, or the like.

The communication I/F 87 is an interface that controls communication between the interference controller apparatus 1 and external devices.

The functions of at least some of the components of the interference controller apparatus 1 shown in FIG. 2 may be realized by the CPU 81 executing the programs. However, at least some of the functions of the components of the interference controller apparatus 3 shown in FIG. 2 may be operated by a dedicated hardware. In this case, the dedicated hardware operates based on the control of the CPU 81.

The UGV 1 and the AR glasses 2 shown in FIG. 2 may have the similar hardware configuration to the interference controller apparatus 3 and may have all or some of the hardware components shown in FIG. 8.

Although certain embodiments have been described above, the embodiments described are merely illustrative and are not intended to limit the scope of the present invention. The apparatus and methods described herein may be embodied in other forms than those described above. In addition, without departing from the scope of the present invention, omissions, substitutions, and modifications may be made to the above embodiments as appropriate. Such omissions, substitutions, and modifications fall within the scope of the appended claims and equivalents thereof, and fall within the technical scope of the present invention.

EMBODIMENTS OF PRESENT DISCLOSURE

The present disclosure includes the following embodiments.

[1] An interference controller apparatus, comprising one or more processors, at least one of the one or more processors being configured to perform: a position acquisition process for acquiring a first position at which an unmanned ground vehicle is positioned and a second position at which a wearable device worn by a user is positioned, respectively; a route information acquisition process for acquiring route information indicating a route on which the unmanned ground vehicle is to travel; a traveling property acquisition process for acquiring a property related to a traveling of the unmanned ground vehicle; a first signal generation process for generating a first signal for displaying, on the wearable device, a first image indicating a direction and a path that the unmanned ground vehicle is to travel based on the first position and the route information; a second signal generation process for generating a second signal for displaying, on the wearable device, a second image indicating a zone where an entry of a user wearing the wearable device is to be restricted, based on the first position, the second position, and the route information; and a transmission process for transmitting the first signal and the second signal to the wearable device, and the first signal generation process generating the first signal such that the first image dynamically changes to be displayed based on the property of the unmanned ground vehicle acquired by the traveling property acquisition process.

[2] The interference controller apparatus according to [1] wherein the first signal generation process generates the first signal such that the first image dynamically changes to be displayed following a speed of the unmanned ground vehicle calculated by the traveling property acquisition process.

[3] The interference controller apparatus according to [1] or [2], wherein the first signal generation process generates the first signal such that the first image dynamically changes to be displayed based on a priority on traveling of the unmanned ground vehicle acquired by the traveling property acquisition process.

[4] The interference controller apparatus according to any one of [1] to [3], wherein the second signal generation process generates the second signal such that the second image dynamically changes to be displayed based on the property of the unmanned ground vehicle acquired by the traveling property acquisition process.

[5] The interference controller apparatus according to any one of [1] to [4], at least one of the one or more processors further being configured to perform: a third signal generation process for generating a third signal to cause the wearable device to display a third image alerting a user to the unmanned ground vehicle when the unmanned ground vehicle is positioned outside a field of view of the wearable device.

[6] The interference controller apparatus according to [5], wherein the third signal generation process generates the third signal such that the third image is displayed at an approximate center position of the field of view of the wearable device.

[7] The interference controller apparatus according to any one of [1] to [6], at least one of the one or more processors further being configured to perform: a transmission destination selection process for selecting a wearable device to which the second signal is to be transmitted based on a relative position of the second position with respect to at least one or more of the first position and the path among a plurality of wearable devices for which the second position is acquired by the position acquisition process.

[8] A wearable device comprising one or more processors, at least one of the one or more processors being configured to perform: a position transmission process for detecting a position at which the wearable device is positioned and transmitting the detected position to an interference controller apparatus connected to the wearable device via a network; a signal reception process for receiving, from the interference controller apparatus in response to the transmitted position, a first signal for displaying a first image indicating a path that the unmanned ground vehicle is to travel, and a second signal for displaying a second image indicating a zone where an entry of a user wearing the wearable device is to be restricted; and an image display process for displaying at least one of the first image and the second image on a display device of the wearable device based on the received first signal and the second signal, and the first image dynamically changing to be displayed based on a property related to a traveling of the unmanned ground vehicle.

[9] An interference controlling method, comprising: acquiring a first position at which an unmanned ground vehicle is positioned and a second position at which a wearable device worn by a user is positioned, respectively; acquiring route information indicating a route on which the unmanned ground vehicle is to travel; acquiring a property related to a traveling of the unmanned ground vehicle; generating a first signal for displaying, on the wearable device, a first image indicating a direction and a path that the unmanned ground vehicle is to travel based on the first position and the route information; generating a second signal for displaying, on the wearable device, a second image indicating a zone where an entry of a user wearing the wearable device is to be restricted, based on the first position, the second position, and the route information; and transmitting the first signal and the second signal to the wearable device, and in generating the first signal, the first signal being generated such that the first image dynamically changes to be displayed based on the property of the acquired unmanned ground vehicle.

[10] An interference controller system, comprising one or more processors, at least one of the one or more processors being configured to perform: a position acquisition process for acquiring a first position at which an unmanned ground vehicle is positioned and a second position at which a wearable device worn by a user is positioned, respectively; a route information acquisition process for acquiring route information indicating a route on which the unmanned ground vehicle is to travel; a traveling property acquisition process for acquiring a property related to a traveling of the unmanned ground vehicle; a first signal generation process for generating a first signal for displaying, on the wearable device, a first image indicating a direction and a path that the unmanned ground vehicle is to travel based on the first position and the route information; a second signal generation process for generating a second signal for displaying, on the wearable device, a second image indicating a zone where an entry of a user wearing the wearable device is to be restricted, based on the first position, the second position, and the route information; and a transmission process for transmitting the first signal and the second signal to the wearable device, and the first signal generation process generating the first signal such that the first image dynamically changes to be displayed based on the property of the unmanned ground vehicle acquired by the traveling property acquisition process.

REFERENCE SIGNS LIST

1: UGV; 2: AR Glasses; 3: Interference Controller Apparatus (Controller Server); 4: Base Station; 5: Core Network; 6: Internet; 11: Sensor; 12: Position Transmitter; 13: Traveling Controller; 14: Communication Controller; 21: Sensor; 22: Position Transmitter; 23: Display Controller; 24: Communication Controller; 31: Position Acquisition Unit; 32: Route Acquisition Unit; 33: Speed Calculation Unit; 34: First Signal Generation Unit; 35: Second Signal Generation Unit; 36: Third Signal Generation Unit; 37: Transmission Destination Selection Unit; 38: Communication Controller; 41,61: First AR Image; 42: Second AR Image; 51: Second AR Image; 81: CPU; 82: ROM; 83: RAM; 84: HDD; 85: Input Unit; 86: Display Unit; 87: Communication I/F; 88: System Bus

What is claimed is:

1. An interference controller apparatus, comprising one or more processors, at least one of the one or more processors being configured to perform:
    a position acquisition process for acquiring a first position at which an unmanned ground vehicle is positioned and a second position at which a wearable device worn by a user is positioned, respectively;
    a route information acquisition process for acquiring route information indicating a route on which the unmanned ground vehicle is to travel;
    a traveling property acquisition process for acquiring a property related to a traveling of the unmanned ground vehicle;
    a first signal generation process for generating a first signal for displaying, on the wearable device, a first image indicating a direction and a path that the unmanned ground vehicle is to travel based on the first position and the route information;
    a second signal generation process for generating a second signal for displaying, on the wearable device, a second image indicating a zone where an entry of a user wearing the wearable device is to be restricted, based on the first position, the second position, and the route information; and
    a transmission process for transmitting the first signal and the second signal to the wearable device, and
    the first signal generation process generating the first signal such that the first image dynamically changes to be displayed based on the property of the unmanned ground vehicle acquired by the traveling property acquisition process.

2. The interference controller apparatus according to claim 1, wherein
    the first signal generation process generates the first signal such that the first image dynamically changes to be displayed following a speed of the unmanned ground vehicle calculated by the traveling property acquisition process.

3. The interference controller apparatus according to claim 1, wherein
    the first signal generation process generates the first signal such that the first image dynamically changes to be displayed based on a priority on traveling of the unmanned ground vehicle acquired by the traveling property acquisition process.

4. The interference controller apparatus according to claim 1, wherein
    the second signal generation process generates the second signal such that the second image dynamically changes to be displayed based on the property of the unmanned ground vehicle acquired by the traveling property acquisition process.

5. The interference controller apparatus according to claim 1, at least one of the one or more processors further being configured to perform:
a third signal generation process for generating a third signal to cause the wearable device to display a third image alerting a user to the unmanned ground vehicle when the unmanned ground vehicle is positioned outside a field of view of the wearable device.

6. The interference controller apparatus according to claim 5, wherein
the third signal generation process generates the third signal such that the third image is displayed at an approximate center position of the field of view of the wearable device.

7. The interference controller apparatus according to claim 1, at least one of the one or more processors further being configured to perform:
a transmission destination selection process for selecting a wearable device to which the second signal is to be transmitted based on a relative position of the second position with respect to at least one or more of the first position and the path among a plurality of wearable devices for which the second position is acquired by the position acquisition process.

8. A wearable device comprising one or more processors, at least one of the one or more processors being configured to perform:
a position transmission process for detecting a position at which the wearable device is positioned and transmitting the detected position to an interference controller apparatus connected to the wearable device via a network;
a signal reception process for receiving, from the interference controller apparatus in response to the transmitted position, a first signal for displaying a first image indicating a path that the unmanned ground vehicle is to travel, and a second signal for displaying a second image indicating a zone where an entry of a user wearing the wearable device is to be restricted; and
an image display process for displaying at least one of the first image and the second image on a display device of the wearable device based on the received first signal and the second signal, and
the first image dynamically changing to be displayed based on a property related to a traveling of the unmanned ground vehicle.

9. An interference controlling method, comprising:
acquiring a first position at which an unmanned ground vehicle is positioned and a second position at which a wearable device worn by a user is positioned, respectively;
acquiring route information indicating a route on which the unmanned ground vehicle is to travel;
acquiring a property related to a traveling of the unmanned ground vehicle;
generating a first signal for displaying, on the wearable device, a first image indicating a direction and a path that the unmanned ground vehicle is to travel based on the first position and the route information;
generating a second signal for displaying, on the wearable device, a second image indicating a zone where an entry of a user wearing the wearable device is to be restricted, based on the first position, the second position, and the route information; and
transmitting the first signal and the second signal to the wearable device, and
in generating the first signal, the first signal being generated such that the first image dynamically changes to be displayed based on the property of the acquired unmanned ground vehicle.

10. An interference controller system, comprising one or more processors, at least one of the one or more processors being configured to perform:
a position acquisition process for acquiring a first position at which an unmanned ground vehicle is positioned and a second position at which a wearable device worn by a user is positioned, respectively;
a route information acquisition process for acquiring route information indicating a route on which the unmanned ground vehicle is to travel;
a traveling property acquisition process for acquiring a property related to a traveling of the unmanned ground vehicle;
a first signal generation process for generating a first signal for displaying, on the wearable device, a first image indicating a direction and a path that the unmanned ground vehicle is to travel based on the first position and the route information;
a second signal generation process for generating a second signal for displaying, on the wearable device, a second image indicating a zone where an entry of a user wearing the wearable device is to be restricted, based on the first position, the second position, and the route information; and
a transmission process for transmitting the first signal and the second signal to the wearable device, and
the first signal generation process generating the first signal such that the first image dynamically changes to be displayed based on the property of the unmanned ground vehicle acquired by the traveling property acquisition process.

* * * * *